United States Patent

Tanihira et al.

[11] Patent Number: 5,828,859
[45] Date of Patent: Oct. 27, 1998

[54] METHOD AND APPARATUS FOR SETTING THE STATUS MODE OF A CENTRAL PROCESSING UNIT

[75] Inventors: Hisamitsu Tanihira, Iwaki; Kazuo Nagahori; Renri Nakano, both of Kawasaki, all of Japan

[73] Assignee: Fujitsu Limited, Kawasaki, Japan

[21] Appl. No.: 492,391

[22] Filed: Jun. 19, 1995

Related U.S. Application Data

[63] Continuation of Ser. No. 948,596, Sep. 23, 1992, abandoned.

[30] Foreign Application Priority Data

Sep. 30, 1991 [JP] Japan ................................ 3-251204

[51] Int. Cl.$^6$ ........................................................ G06F 12/00
[52] U.S. Cl. ............................ 395/376; 395/377; 395/384; 395/385; 395/386; 395/387; 395/564; 395/800
[58] Field of Search ............................ 395/800, 375, 395/376, 384, 389, 564, 570, 377, 385, 386, 387; 364/DIG. 1

[56] References Cited

U.S. PATENT DOCUMENTS

| | | |
|---|---|---|
| 3,909,802 | 9/1975 | Cassarino, Jr. et al. ............. 340/172.5 |
| 4,136,383 | 1/1979 | Takesue ................................. 395/375 |
| 4,145,761 | 3/1979 | Gunter et al. ......................... 365/277 |
| 4,442,319 | 4/1984 | Tereidl ................................... 179/2 A |
| 4,580,240 | 4/1986 | Watanabe .............................. 395/445 |
| 4,876,639 | 10/1989 | Mensch, Jr. .......................... 395/385 |
| 4,894,768 | 1/1990 | Iwasaki et al. ....................... 395/200 |
| 4,920,482 | 4/1990 | Hasebe et al. ........................ 395/375 |
| 5,045,993 | 9/1991 | Murakami et al. ................... 395/583 |
| 5,175,853 | 12/1992 | Kardach et al. ...................... 395/650 |
| 5,274,776 | 12/1993 | Senta .................................... 395/375 |
| 5,274,831 | 12/1993 | Katsuta ................................. 395/800 |
| 5,367,676 | 11/1994 | Katori ................................... 395/600 |
| 5,440,747 | 8/1995 | Kiuchi .................................. 395/740 |

*Primary Examiner*—Alyssa H. Bowler
*Assistant Examiner*—Dzung C. Nguyen
*Attorney, Agent, or Firm*—Staas & Halsey

[57] ABSTRACT

Data for designating a status mode is written beforehand in a data portion of a data-type microinstruction. When power is introduced, first, the data type microinstruction is read. Next, a status-mode setting circuit generates an enable signal. The enable signal is only generated at the initial reading of the data-type microinstruction. The status-mode designating data written in the data portion of the microinstruction is stored in a status-mode memory in response to the enable signal. A central processing unit reads the status-mode designating data that has been stored in the status-mode memory and executes processing conforming to the status mode read.

3 Claims, 8 Drawing Sheets

METHOD AND APPARATUS FOR SETTING THE STATUS MODE OF A CENTRAL PROCESSING UNIT

This application is a continuation of application Ser. No. 07/948,596, filed Sep. 23, 1992, now abandoned.

BACKGROUND OF THE INVENTION

This invention relates to a status mode setting method and an apparatus therefor, in which a status mode is set in a microprogram-type central processing unit for executing processing in conformity with the status mode that has been set. More particularly, the invention relates to a method and apparatus for setting a status mode, in which the microcode of a microinstruction is used as status-mode designating data in the setting of a status mode.

There are occasions where a central processing unit is provided with several status modes in order to furnish the unit with versatility, and the central processing unit is adapted to execute processing that is in accordance with the status mode that has been set. To accomplish this, it is necessary to set, before the central processing unit is used, the particular status mode in accordance with which processing is to be executed.

For example, in a case where such circuits as a number of channel controllers, an instruction read-out gate, a data read/write circuit and a memory refresh circuit are connected to a memory bus, it is necessary that the order of priority of each circuit, according to which circuit has the privilege to use the memory bus, be set as a status mode. FIG. 1 is a block diagram showing the construction of a system which shares a single memory bus. In FIG. 1, numeral 2 denotes a central processing unit; 6, a memory which stores a program or data; 7, a memory bus; 8a and 8b channel controllers; and 9a and 9b, disk devices. The central processing unit 2 includes an instruction execution section 2a which internally incorporates an arithmetic unit, an instruction counter, various registers and the like; an instruction reader 2b for reading a prescribed instruction out of the memory 6 and delivering it to the instruction executing section in accordance with an indication from the instruction executing section; a data reader/writer 2c which, in accordance with an indication from the instruction executing section, writes prescribed data in the memory or reads data out of the memory and delivers it to the instruction executing section; a memory refresh section 2d for periodically refreshing the content of the memory; a bus arbitrator 2e which, when bus-use request signals R1~R5 enter simultaneously from each of the units, inputs bus-use acknowledgment signals ACK1~ACK5 to prescribed units in accordance with the order of priority of bus use, thereby allowing access to the memory; and a storage section 2f for storing the order of priority for use of the bus. In a system of this kind, it is required that the order of priority for the privilege to use the memory bus be stored in the storage section 2f as a status mode.

In the prior art, such setting of status mode is performed in a manner which will now be described.

As shown in FIG. 2, a first status-mode setting method involves providing a status-mode setting switch 1, connecting the mode-status setting switch 1 and the storage section 2f of the central processing unit 2 by a plurality of special-purpose signal lines 3. Additionally, the first status-mode setting method involves setting the switch 1 to a status mode, inputting the status mode to the central processing unit 2 via the special-purpose signal lines 3 and setting it in the storage section 2f central processing unit. A microprogram control mechanism is connected to the central processing unit 2. In order to execute instructions of a central processing unit, it is necessary to perform such basic operations as the reading of instructions, the decoding of instructions, the computing of execution addresses, the reading of operands and the execution of arithmetic operations in a fixed sequence. To this end, a program (a microprogram) in which the execution of each of the instructions is described as a combination of basic operations of several types is stored in a ROM within the microprogram control mechanism 4. Additionally, a prescribed microinstruction conforming to the status of the central processing unit is read out. Moreover, and control signals necessary for such basic operations as transfers between registers, transfers between buses and registers and arithmetic operations are inputted to the central processing unit by the microinstructions.

As shown in FIG. 3, a second status-mode setting method involves providing a mode setting circuit 5 for setting status mode outside the central processing unit 2, connecting the status-mode setting circuit 5 to an existing data bus DBUS, and having the central processing unit 2 accept status-mode designating data from the mode setting circuit 5 via the data bus DBUS.

The first status-mode setting method is a simple one. However, if the central processing unit is realized in the form of an LSI, there is a limitation upon the number of signal pins. Therefore, the setting of a large number of status modes cannot be realized. Moreover, externally added circuitry such as the switch is necessary, leading to problems in miniaturizing the apparatus.

Though the second status-mode setting method does not involve a problem with the number of pins, as in the case of the first method, it is required that the mode setting circuit be externally provided. Moreover, the mode setting circuit is required to have a function for exchanging data with the central processing unit via the data bus. As a result, the arrangement is a complicated one and problems arise in terms of cost and miniaturization.

SUMMARY OF THE INVENTION

Accordingly, an object of the present invention is to provide a method and apparatus for setting status modes, in which there is no limitation upon the number of status modes and advantages are gained in terms of cost and miniaturization.

Another object of the present invention is to provide a method and apparatus for setting status modes, in which externally added circuitry such as switches is unnecessary and externally providing a mode setting circuit is not required.

According to the present invention, the foregoing objects are attained by providing a status mode setting method for setting status modes in a microprogram-type central processing unit, comprising the steps of writing status-mode designating data beforehand in a data portion of a microinstruction of a prescribed type read out first following introduction of power; generating an enable signal, which is for setting of a status mode, only at initial reading of the microinstruction of the prescribed type after power has been introduced; setting the status-mode designating data, which has been written in the data portion of the microinstruction, in a status-mode memory based upon the enable signal; and causing the central processing unit to read the status-mode designating data, that has been set in the status-mode memory; and execute processing conforming to the status mode that has been set.

According to the present invention, the foregoing objects are attained by providing a status mode setting apparatus for setting status modes in a microprogram-type central processing unit, comprising a microprogram control mechanism for storing a microprogram constituted by a number of microinstructions, reading out a prescribed microinstruction based upon a status signal from the central processing unit and inputting this microinstruction to the central processing unit; a status-mode setting circuit for generating an enable signal for setting of status mode only when a microinstruction of a prescribed type is initially read out after power has been introduced; and a status-mode memory for storing status-mode designating data, which has been written in a data portion of the microinstruction of the prescribed type, based upon the enable signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

DESCRIPTION OF THE PREFERRED EMBODIMENT (a) General features of the invention FIG. 4 is a block diagram showing the general features of the present invention. Illustrated in FIG. 4 is a central processing unit 11 which includes a processor 11a, a status-mode setting circuit 11b which generates an enable signal for setting status mode, and a status-mode memory 11c which stores a status mode that has been set. MIPR represents a microprogram, which includes a data-type microinstruction DMIC.

Data for designating the status mode is written beforehand in a data portion (DATA) of a data-type microinstruction DMIC that will be read out first following the instruction of power. When power is introduced to the system, the status-mode setting circuit 11b generates the enable signal only at the initial reading of the data-type microinstruction DMIC. The status-mode memory 11c responds to the enable signal by storing the status-mode designating data that has been written in the data portion (DATA) and the processor 11a reads this status-mode designating data and executes processing in a manner conforming to the status mode that has been set.

Thus, since the microinstruction of a prescribed type in an existing microprogram is used for setting the status mode, special-purpose signal lines for setting the status mode as well as externally added circuitry are not required. This makes it possible to lower cost and reduce size. In addition, the data which designates the status mode needs only to be written in the data portion of the data-type microinstruction. It is unnecessary to prepare a special microinstruction for the purpose of setting the status mode and to specially create a microprogram in order to set the status mode. Thus, the status mode can be set in a simple manner.

(b) Embodiment of the invention

Over all Construction

Figure 1:
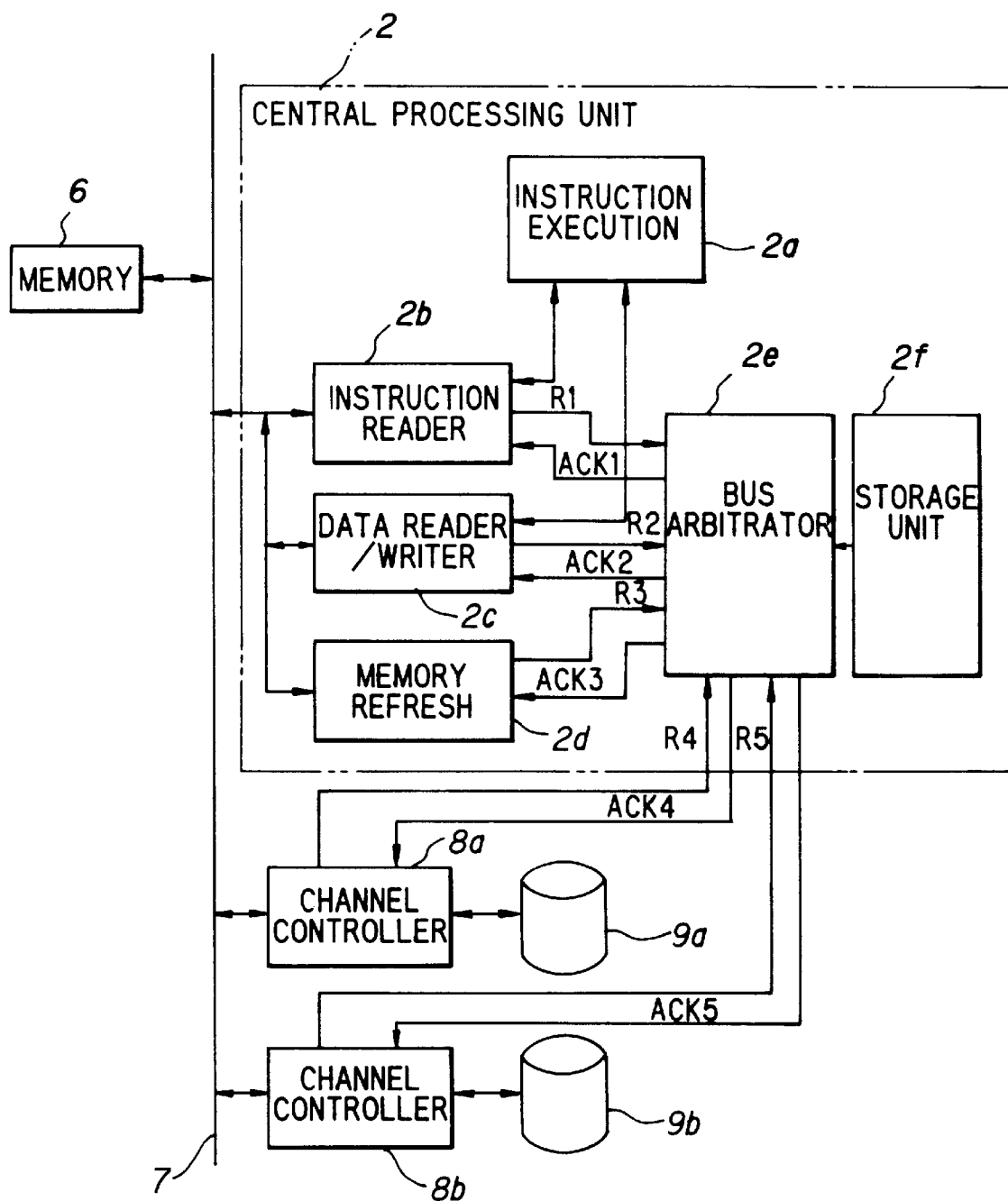
FIG. 1 is a block diagram showing the construction of a system which shares a memory bus.
Figure 2:
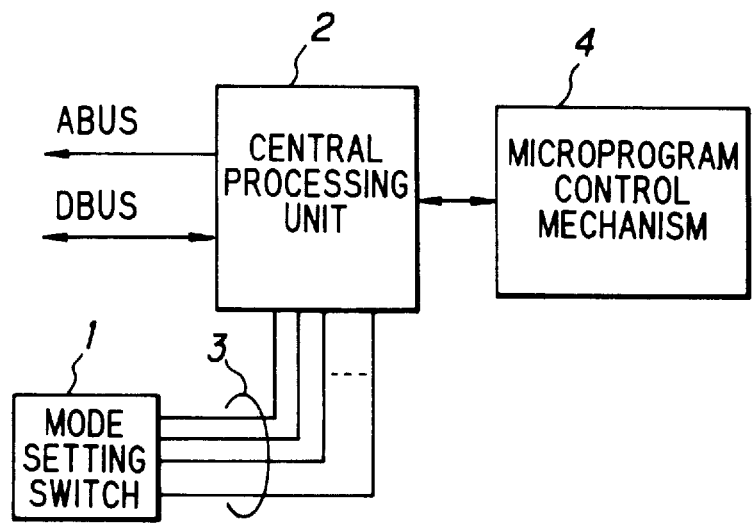
FIG. 2 is a block diagram for describing a first mode-setting method according to the prior art.
Figure 3:
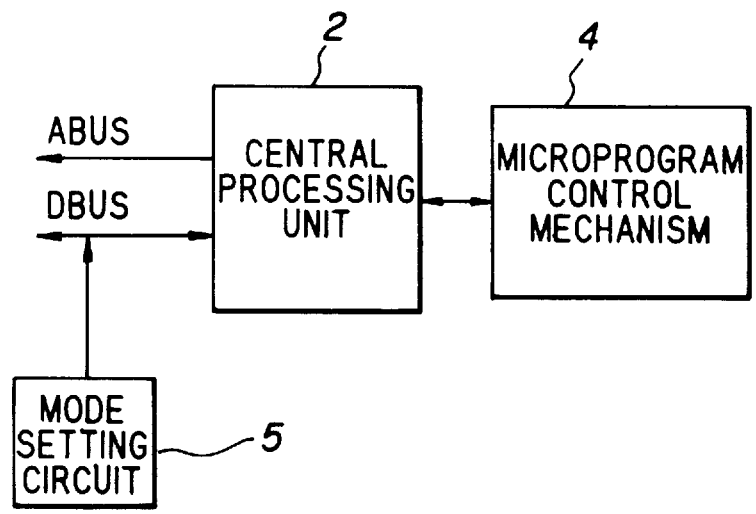
FIG. 3 is a block diagram for describing a second mode-setting method according to the prior art.
Figure 4:
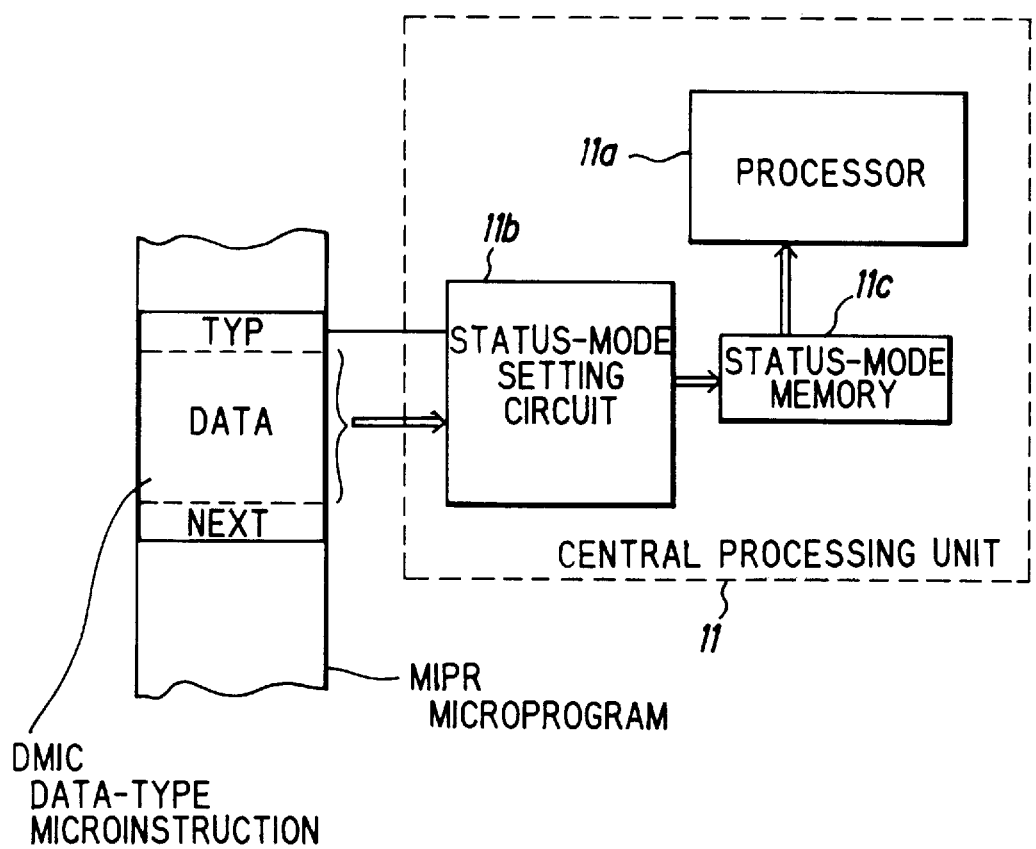
FIG. 4 is a block diagram for describing the general features of the present invention.
Figure 5:
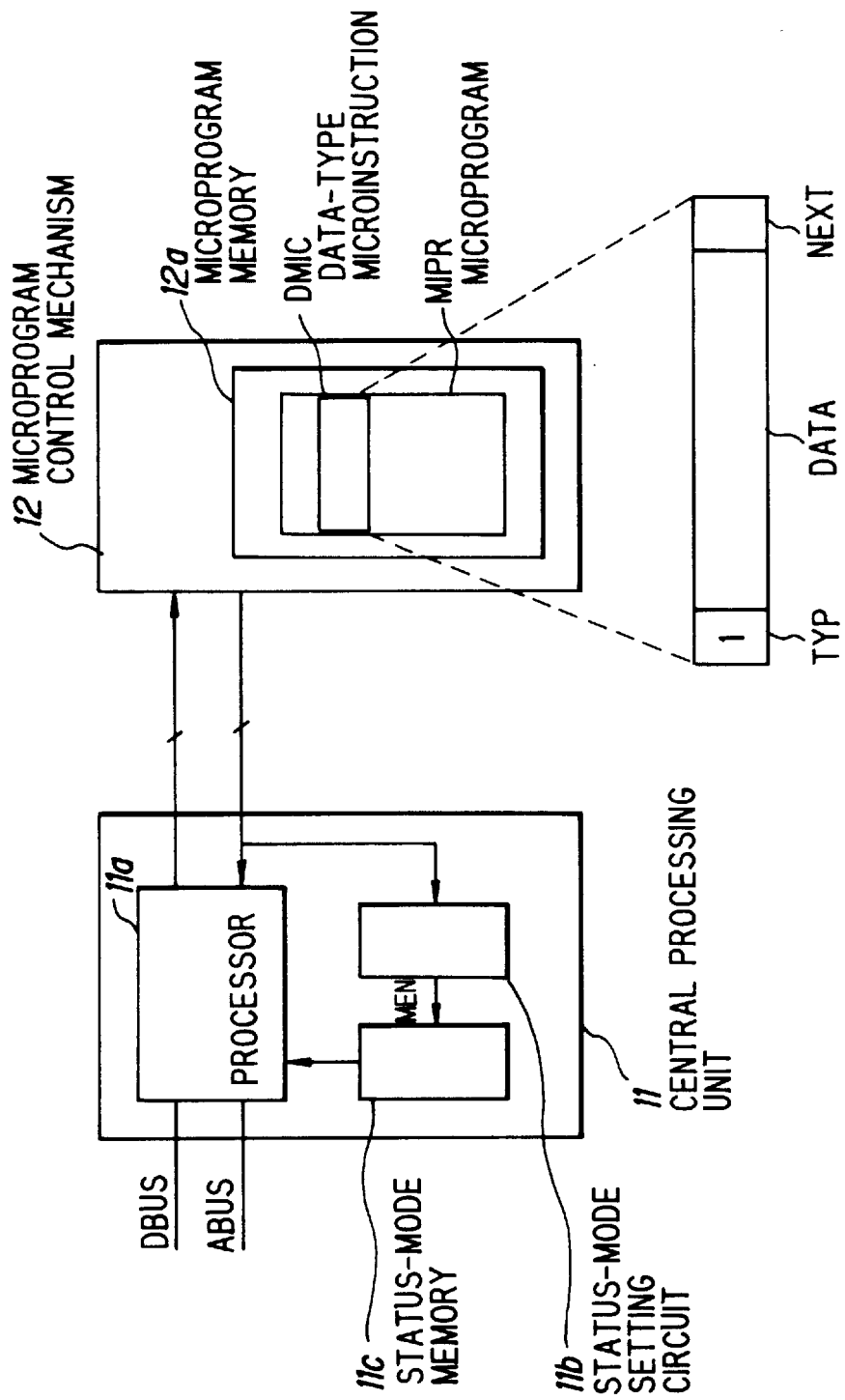
FIG. 5 is a diagram showing the construction of an embodiment of the invention.

FIG. 5 is a diagram showing the construction of an embodiment according to the present invention. Portions identical with those shown in FIG. 4 are designated by like reference characters. Numeral 11 denotes the central processing unit, and numeral 12 denotes a microprogram control mechanism. The central processing unit 11 includes the processor 11a, the status-mode setting circuit 11b which generates an enable signal MEN for setting the status mode, and the status-mode memory 11c which stores a status mode that has been designated. The microprogram control mechanism 12 includes a microprogram memory (ROM) 12a which stores the microprogram MIPR. The microprogram MIPR has an initial data-type microinstruction DMIC that is read after the introduction of power.

Microinstruction

Figure 6:
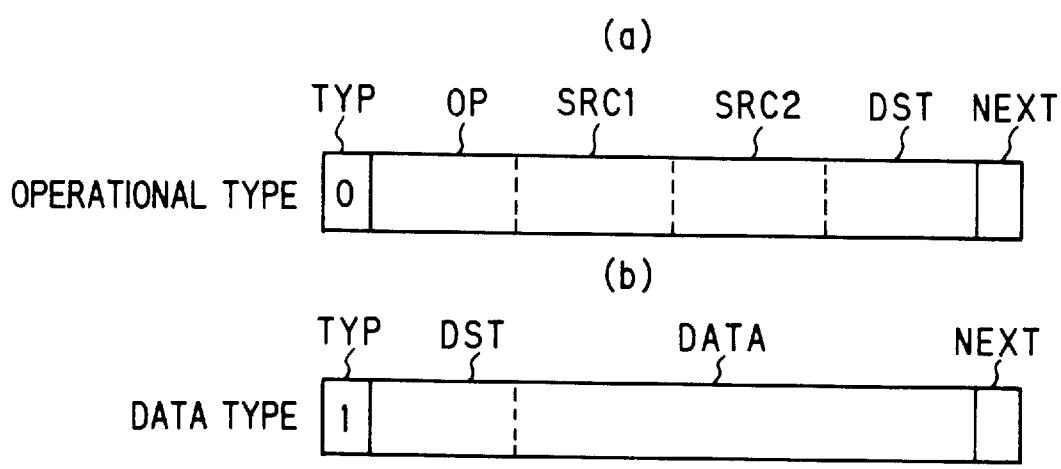
FIG. 6 is a diagram for describing the format of a microinstruction.

As illustrated in FIGS. 6(a), (b), microinstructions are of two types, namely an operational type and a data type. An operational-type micro-instruction has a type classifying portion TYP composed of one bit, an operating portion OP in which a microinstruction code is written, two operational-input source portions SRC1 and SRC2 indicating the sources of operational data input, an output destination portion DST indicating the output destination of operational results, and a next-address portion NEXT indicating the next microinstruction address. The data-type microinstruction has a type classifying portion TYP composed of one bit, an output destination portion DST indicating the destination of data output, a data portion DATA in which data is written, and a next-address portion NEXT indicating the next microinstruction address.

In the case of the operational type, "0" is written in the type classifying portion TYP. In the case of the data type, "1" is written in the type classifying portion TYP. Accordingly, the type of microinstruction can be identified by monitoring the "1"/"0" logic in the type classifying portion TYP.

In the data-type microinstruction, data designating the status mode is written beforehand in the data portion (DATA) of the first microinstruction DMIC read following the introduction of power. For example, if there are n-types of status modes and on/off is set for each mode, the on/off of the status mode will be written as "1" or "0" in the corresponding bit of the data portion DATA. In other words, data for designating the status mode will be composed of n bits. In a case where the order of priority for use of the memory bus is set, a prescribed n-bit pattern in accordance with the order of priority is written in the data portion DATA.

Microprogram Control Mechanism

Figure 7:
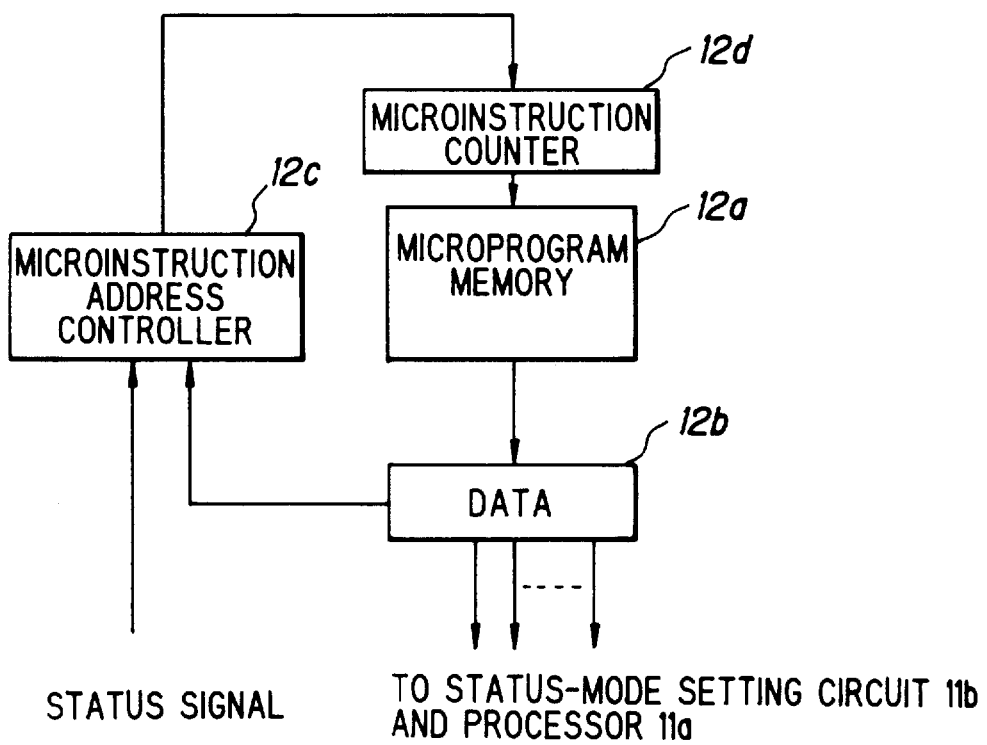
FIG. 7 is a block diagram showing the general construction of a microprogram control mechanism.

As shown generally in FIG. 7, the microprogram control mechanism 12 has a microprogram memory 12a; a microinstruction register 12b for storing a microinstruction read out of the microprogram memory 12a; a microinstruction address control unit 12c to which a status signal outputted by the central processing unit, or the next address of a microinstruction, is inputted for generating the next microinstruction address; and a microinstruction counter 12d for storing the microinstruction address. Output lines from the microinstruction register 12b are connected to the input side of the status-mode setting circuit 11b (see FIG. 5) or the input side of the processor 11a.

During execution in accordance with the program of the central processing unit, the microinstruction read out of the microprogram memory 12a is set in the microinstruction register 12b. If the microinstruction is a microinstruction for gate control, then, when the i-th (i=1, 2, ...) bit of the data portion is "1", the corresponding gate is turned on. However, when the data-type microinstruction read out first following the introduction of power and the i-th (i=1, 2, ...) bit of the data portion is "1" or "0", the corresponding status mode is regarded as being turned on or off and this is stored in the status-mode memory 11c (see FIG. 5).

Status-Mode Setting Circuit and Status-Mode Memory

Figure 8:
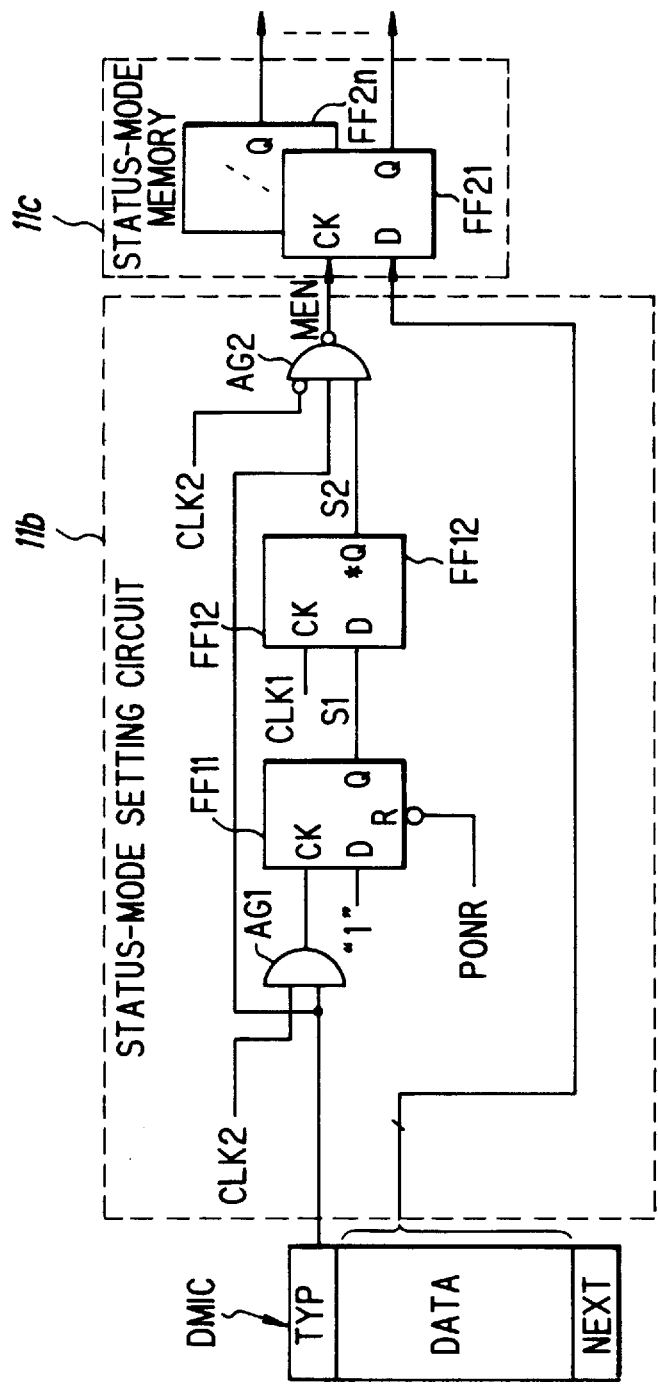
FIG. 8 is a diagram showing a status-mode setting circuit according to the invention.

FIG. 8 is a diagram showing the construction of the status-mode setting circuit 11b. The circuit has two flip-flops FF11, FF12 and two AND gates AG1, AG2 for each status mode.

A second clock CLK2 and the type classifying data TYP of the microinstruction are inputted to the AND gate AG1, the output whereof is inputted to a clock terminal of the flip-flop FF11.

The flip-flop FF11 is reset to Q="0" by a power-on reset signal PONR generated following the introduction of power. When the output of the AND gate AG1 attains the high level ("1"), the flip-flop FF11 is set to Q="1" since the D terminal thereof is "1" at all times. A first clock CLK1 is inputted to the clock terminal of a flip-flop FF12, and the Q output of the flip-flop FF11 is applied to the D input terminal of flip-flop FF12.

The second clock CLK2, the type classifying data TYP of the microinstruction and the *Q output (where "*" represents negation) of flip-flop FF12 are inputted to the AND gate AG2, the enable signal MEN for setting the status mode is generated and, in synchronization with the leading edge thereof, the n-bit status-mode designating data that has been written in the data portion DATA is stored in flip-flops FF21~F2n, which construct the status-mode memory 11c.

Overall Operation

Figure 9:
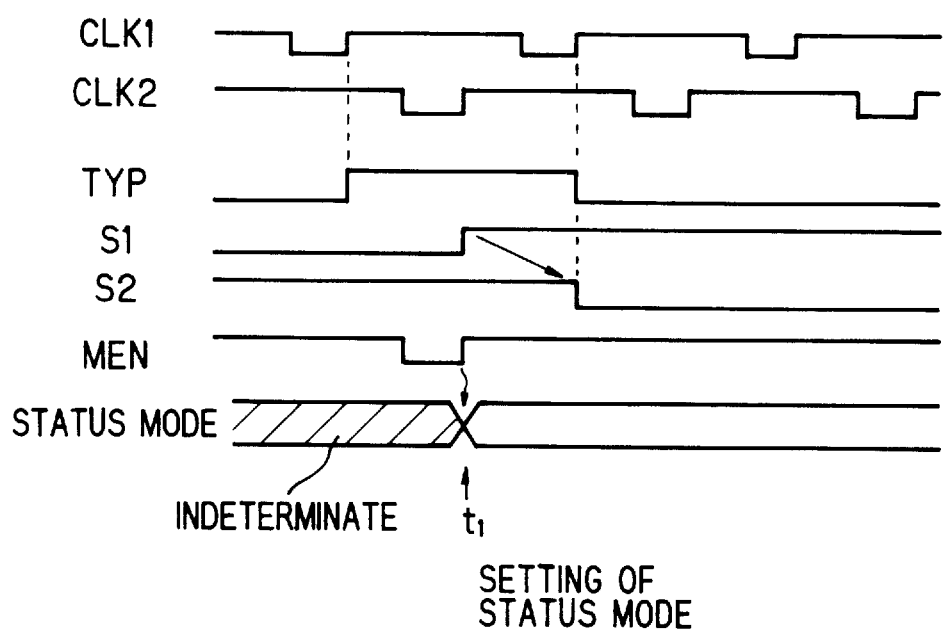
FIG. 9 is a time chart for describing the operation of the circuit shown in FIG. 8.

FIG. 9 is a time chart for describing overall operation. The first clock CLK1 leads the second clock CLK2 by a phase of 180°. The operation for setting the status mode of the invention will be described in accordance with FIGS. 5, 8 and 9. In the data-type microinstruction contained in the microprogram, the n-bit data for designating the status mode is written beforehand in the data portion (DATA) of the microinstruction DMIC read first following the introduction of power.

When power is introduced, the power-on reset signal PONR is generated and the first flip-flop FF11 is reset, whereby the Q-terminal output S1 falls to the low level. Next, the second flip-flop FF12 is reset to "0" by the first clock CLK1 so that its *Q output S2 attains the high level. This state corresponds to that at the beginning of the time chart of FIG. 9, in which the status mode is indeterminate.

After power-on reset, the microprogram starts. Then, when the data-type microinstruction is first read, the type classifying data TYP goes to logical "1" for a predetermined period of time. At time $t_1$, which is synchronized to the leading edge of the second clock CLK2, the first flip-flop FF11 is set so that S1="1" is established. Further, the status-mode enable signal MEN, which is the output of the AND gate AG2, attains the high level. In synchronization with the status-mode enable signal MEN, the n-bit status-mode designating data that has been written in the data portion DATA of the data-type microinstruction DMIC is stored in the n-number of flip-flops FF21~F2n of the status-mode memory 11c.

Thereafter, since the first flip-flop FF11 is fixed at Q="1", the *Q output of the second flip-flop FF12 also is fixed at "0" and the status-mode enable signal MEN remains at the high level. Accordingly, even if a data-type microinstruction is subsequently outputted and the condition TYP="1" is established, the content of the status-mode memory 11c remains unchanged.

Thereafter, the processor 11a reads the status-mode designating data out of the status-mode memory 11c and executed processing that conforms to this status mode.

Since the status mode of the central processing unit is thus set using an existing microinstruction, special-purpose lines and external circuitry need not be provided and a special microinstruction is not required.

Furthermore, the creation of microcodes is facilitated by using the data type as the type for designating the status mode. The description of a microprogram actually is carried out by putting code into the form of symbols and thus using the symbols. For this reason, if the designation of the mode were to be performed by the operational type, it would be necessary to produce codes using symbols that are entirely unrelated to mode in order to the produce the status-mode designating data. This would involve great difficulty. By contrast, in the case of the data type, the description of the DATA portion merely entails describing the code actually placed in this portion, and therefore the status-mode designating data is produced with the conventional description left as is. As a result, the creation of the status-mode designating data is facilitated and special tools are unnecessary.

Thus, in accordance with the present invention, as described above, data for designating a status mode is written beforehand in a data portion (DATA) of a microinstruction of a prescribed type, e.g., the data type, that will be read out first following the instruction of power. After power is introduced, the status-mode designating data that has been written in the data portion (DATA) of the data-type microinstruction to be read first is stored in a memory, the status-mode designating data is read out of the memory and processing conforming to the status mode that has been set is executed. As a result, a status mode can be set using a microinstruction of a prescribed type in an already existing microprogram. In addition, special-purpose lines and external circuitry need not be provided, thus making it possible to lower cost and reduce size.

Further, in accordance with the invention, the data specifying the status mode need only be written in the data portion of the data-type microinstruction. This means that it is unnecessary to prepare a special microinstruction for the purpose of setting the status mode and to specially create a microprogram in order to set the status mode. The status-mode designating data can be written in the microinstruction in a simple manner As many apparently widely different embodiments of the present invention can be made without departing from the spirit and scope thereof, it is to be understood that the invention is not limited to the specific embodiments thereof except as defined in the appended claims.

What is claimed is:

1. A status-mode setting method for setting status-modes in a computer system having a microprogram-type central processing unit (CPU) for processing based on said status-modes that have been set, comprising the steps of:

storing a microinstruction of a prescribed type, as a first microinstruction together with microinstructions of other types in a memory, the microinstruction of the prescribed type having a status mode indicator in a data portion;

reading the microinstructions from the memory when power is introduced to the computer system;

deciding whether a first of the prescribed type of the microinstructions is read from the memory; and storing the status-mode indicator, which has been written in the data portion of the prescribed type microinstruction, in a status-mode memory when the first of the prescribed type of the microinstructions is read and supplying said status-mode indicator to the microprogram-type CPU to set the selected status-mode of the microprogram-type CPU, and wherein the microinstruction of said prescribed type is a data type microinstruction.

2. A status-mode setting apparatus for setting status-modes in a processor of a microprogram-type central processing unit for processing according to said status-modes that have been set, comprising:

a microprogram control mechanism for storing a microprogram comprising microinstructions, each of said microinstructions being a prescribed type and having a data portion, said data portion including status-mode designating data, receiving a status signal from the microprogram type central processing unit and outputting one microinstruction of the microinstructions of a data-type microinconstruction to the processor of the microprogram-type central processing unit based on said status signal;

a status-mode setting circuit, coupled to said microprogram control mechanism, for generating an enable signal, to set a status-mode, when the one microinstruction of the microinstructions of a prescribed type, is initially read by the processor after power has been introduced to the microprogram type central processing unit; and a status-mode memory, coupled to said status-mode setting circuit, for receiving the enable signal, storing the status-mode designating data in response to the enable signal and supplying the status-mode designating data to the processor comprising:

a first flip-flop reset by a power-on reset signal generated after introduction of the power, and set by a data-type microinstruction;

a second flip-flop coupled in cascade with said first flip-flop, for receiving the output of said first flip-flop, said second flip-flop being set after a prescribed period of time; and a gate circuit coupled to said second flip flop for receiving an output from said second flip-flop and generating the enable signal for setting the status-mode, when the data-type microinstruction is initially read out after the introduction of power.

3. A status-mode setting apparatus for setting status-modes in a processor of a microprogram-type central processing unit for Processing according to said status-modes that have been set, comprising:

a microprogram control mechanism for storing a microprogram comprising microinstructions, each of said microinstructions being a prescribed type and having a data portion, said data portion including status-mode designating data, receiving a status signal from the microprogram type central processing unit and outputting one microinstruction of the microinstructions of a data-type microinconstruction to the processor of the microprogram-type central processing unit based on said status signal;

a status-mode setting circuit, coupled to said microprogram control mechanism, for generating an enable signal, to set a status-mode, when the one microinstruction of the microinstructions of a prescribed type, is initially read by the processor after power has been introduced to the microprogram type central processing unit; and a status-mode memory, coupled to said status-mode setting circuit, for receiving the enable signal, storing the status-mode designating data in response to the enable signal and supplying the status-mode designating data to the processor, and wherein the microprogram-type central processing unit reads the status-mode designating data stored in the status-mode memory and executes processing conforming to the status-mode that has been read.

* * * * *

UNITED STATES PATENT AND TRADEMARK OFFICE
CERTIFICATE OF CORRECTION

PATENT NO.: 5,828,859
DATED : October 27, 1998
INVENTOR(S): Hisamitsu TANIHIRA, et al.

It is certified that error appears in the above-identified patent and that said Letters Patent is hereby corrected as shown below:

Col. 4, line 14, change "Over all" to --Overall--;
line 32, change "micro-instruction" to --microinstruction--.

Col. 8, line 18, change "Processing" to --processing--.

Signed and Sealed this

Thirtieth Day of March, 1999

Attest:

Q. TODD DICKINSON

Attesting Officer

Acting Commissioner of Patents and Trademarks